United States Patent
Eichhorn et al.

[11] Patent Number: 6,116,764
[45] Date of Patent: Sep. 12, 2000

[54] HEADLIGHT FOR VEHICLE

[75] Inventors: Karsten Eichhorn, Ennigerloh; Franz-Josef Kalze, Harsewinkel; Ewald Topp, Anroechte, all of Germany

[73] Assignee: Hella KG Hueck & Co., Lippstadt, Germany

[21] Appl. No.: 09/301,011

[22] Filed: Apr. 28, 1999

Related U.S. Application Data

[63] Continuation of application No. PCT/EP98/05553, Sep. 2, 1998.

[30] Foreign Application Priority Data

Sep. 6, 1997 [DE] Germany .......................... 197 39 089

[51] Int. Cl.[7] .................................................. B60Q 1/08
[52] U.S. Cl. ...................... 362/512; 362/282; 362/322
[58] Field of Search .................................. 362/459, 487, 362/506, 507, 509, 512, 513, 538, 539, 277, 282, 284, 317, 319, 310, 322, 324, 351, 361

[56] References Cited

U.S. PATENT DOCUMENTS 5,707,129 1/1998 Kobayashi .................................. 362/66

FOREIGN PATENT DOCUMENTS

| | | |
|---|---|---|
| 0 723 108 A1 | 11/1995 | European Pat. Off. . |
| 0 761 497 A2 | 3/1997 | European Pat. Off. . |
| 35 06 405 C2 | 8/1985 | Germany . |
| 36 01 388 A1 | 7/1987 | Germany . |
| 43 18 315 A1 | 12/1993 | Germany . |
| 43 24 829 A1 | 2/1994 | Germany . |
| 43 35 286 A1 | 4/1994 | Germany . |
| 43 42 928 A1 | 7/1994 | Germany . |
| 44 36 684 A1 | 5/1995 | Germany . |
| 070229403 | of 1995 | Japan ...................................... 362/539 |
| 7-029403 | 1/1995 | Japan . |

OTHER PUBLICATIONS

Patent Abstracts Of Japan vol. 095, No. 004, 31. Mai 1995 & JP 07 021803 A (Toyota Motor Corp), Jan. 24, 1995.

Patent abstract of Pub. No. 07021803 by Takakazu, Jan. 24, 1995.

*Primary Examiner*—Sandra O'Shea
*Assistant Examiner*—Peggy A Neils

[57] ABSTRACT

A headlight, having a bowel shaped reflector with two focal points and a lens, includes a screen shaft positioned between the lens and the reflector, a rotational axis of which extends horizontally and at a right angle to an optical axis. The screen shaft is adjustable to a plurality of rotational positions and has in each rotational position a focal line, which produces a light-dark border of a light pattern. A mantle surface of the screen shaft has at least one surface portion which connects two focal lines which extends irregularly to, and deviates from, a cylindrical surface.

16 Claims, 3 Drawing Sheets

Basically City/Bad Weather Light

Low Beam

Expressway Light

High Beams

HEADLIGHT FOR VEHICLE

This application is a Continuation of International Application No. PCT/EP98/05553 filed Sep. 2, 1998.

BACKGROUND OF THE INVENTION

This invention concerns a headlight for vehicles with a bowl shaped reflector having two focal areas and a screen, or shading, shaft arranged between a lens and the reflector, the screen shaft being adjustable to a plurality of rotational positions about an axis of rotation extending horizontally and at a right angle to an optical axis and having a mantle surface with a focal line for each rotational position, which produces a light-dark border of a light figure, or pattern.

Such a headlight for vehicles is disclosed in DE 43 35 286 A1 which has a light system, essentially including an ellipsoidal reflector, a light source disposed at an interior focal area of the reflector, a light collecting lens, and a rotatable stop, or screen, shaft located between the reflector and lens. A gas discharge lamp can serve as a light source. The rotatable screen shaft is coupled to at least one driving mechanism. The axis of rotation of the screen shaft extends horizontally and at a right angle to an optical axis of the light system and is eccentrically aligned to cylindrical mantle-surface portions of the screen shaft. The cylindrical mantle-surface portions of the screen shaft are arranged to be so offset from one another, that the screen shaft has a surrounding step. The driving mechanism makes the screen shaft rotatable to a plurality of positions of rotation. In each position of rotation, the mantle surface forms at its upper portion, a focal line, which creates a light-dark border of a light pattern. Because of the eccentrically disposed axis of rotation, in each position of rotation of the screen shaft, the focal lines extend at a different level of elevation. In this regard, in a plurality of positions of rotation of the screen shaft, an asymmetrical low beam light is emitted. Only in a single position of rotation of the screen shaft is there an optically-effective focal line running in a horizontal plane over its entire length. Thus, only a single symmetrical light bundle is possible. Furthermore, the focal lines, because of the cylindrical mantle surface portions of the screen shaft, cannot assume a desired configuration, as is the case with a stationary screen. It is additionally disadvantageous, that the focal lines, except for a single focal line, when in their active placements relative to a focusing area of the lens, have quite different spacings, due to the eccentric positioning of the axis of rotation relative to the cylindrical mantle surface of the screen shaft. Only a focal line extending through the focusing area of the lens, or near to it, produces a sharp light-dark border, while the other focal lines produce a blurred light-dark border. The unsharpness of the light-dark border grows, the further the focal line is spaced from the focusing area of the lens. For low beams, a fuzzy light-dark border is undesirable, due to glare danger to oncoming traffic.

DE 44 36 684 A1 discloses a headlight for vehicles which, additionally to having a light system with a screen shaft, has a further light system for high beams integrated into the headlight. Since an additional system is necessary for the high beam function, the headlight must be constructed of large size, and a corresponding cost of manufacture is high.

In the case of a headlight disclosed in EP 0 723 108 A1, a first screen plate having two screen edges for producing asymmetric low beams, is pivotal about an axis of rotation; while an additional second stationary screen placed at an appropriate distance from the first screen is required for producing high beam illumination. The first screen plate for low beams extends in its rotational position for long distance illumination, in a horizontal plane. This is disadvantageous, in that only two different low beam bundles are possible and by switching the first screen between the two low beam functions, oncoming traffic is blinded for a short period by the very wide ranging long distance beam.

It is an object of this invention to provide a headlight of the type described in the opening paragraph above in which each focal line of the screen shaft has a desired and exact shape required for a respective light pattern.

SUMMARY OF THE INVENTION

According to principles of this invention, a mantle surface of a screen shaft has at least one surface portion connecting two focal lines which extends irregularly and deviating from a cylindrical surface. This allows the screen shaft to have two symmetrical-light-pattern producing focal lines (as an example, for fog lights and long distance beams) and several asymmetric low-beam-producing focal lines. The focal lines for symmetrical low beams can extend concave or in straight lines, while the focal lines for low beams can extend inclined or optionally curved. Further, the screen shaft can be so arranged, that an axis of rotation runs through, or near, a center of mass of the screen shaft and thus no balancing weight is necessary for the screen shaft. A spacing of most of the focal lines from the axis of rotation can be substantially smaller than for known screen shafts with cylindrical mantle surface sections. Thus, a mass of the screen shaft is smaller than that of conventional screen shafts. Where the screen shaft is of less mass, then too, the drive means can be of correspondingly smaller dimensions.

BRIEF DESCRIPTION OF THE DRAWINGS

The invention is described and explained in more detail below using an embodiment shown in the drawings. The described and drawn features can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
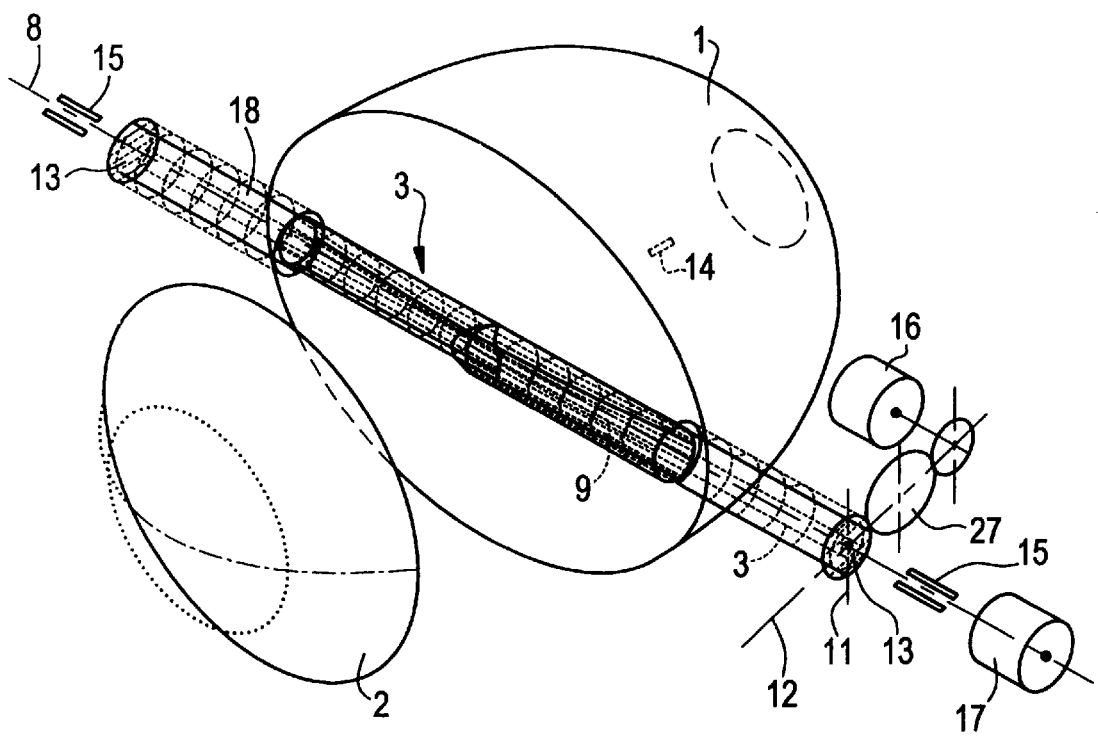
FIG. 1 is a perspective view, schematically illustrating principles of a vehicle-headlight light system of this invention, essentially comprising of a reflector, a lens and a screen shaft with driving means.
Figure 2:
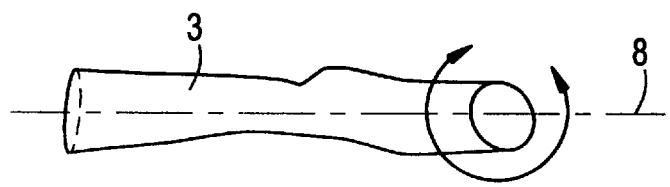
FIG. 2 is a perspective view of the screen shaft of FIG. 1 as an individual part.
Figure 3A:
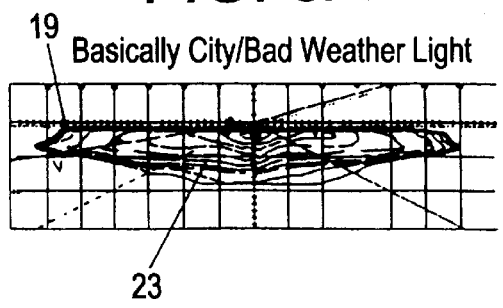
FIGS. 3A and 3B are diagrammatically-depicted light patterns basically for cities or bad weather, respectively on a vertical wall and on a driving lane.
Figure 3B:
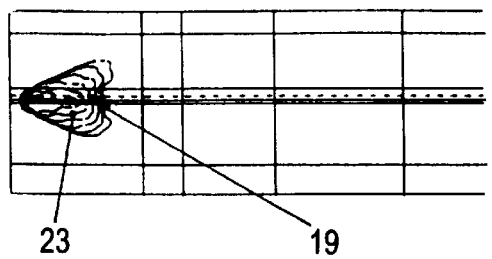
Figure 4A:
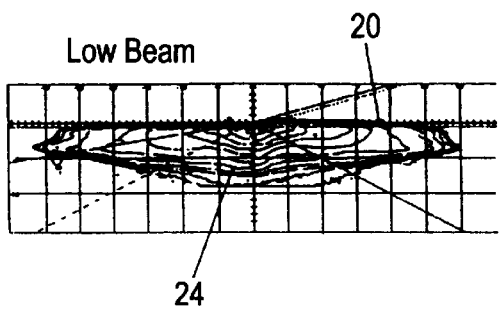
FIGS. 4A and 4B are diagrammatically-depicted light patterns for low beam light, respectively on a vertically standing measuring wall and on a driving lane.
Figure 4B:
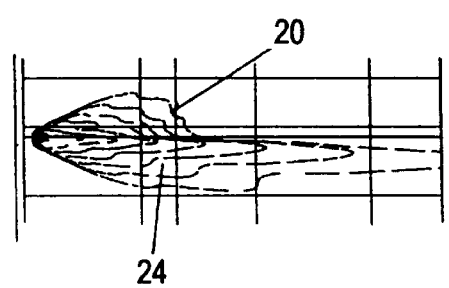
Figure 5A:
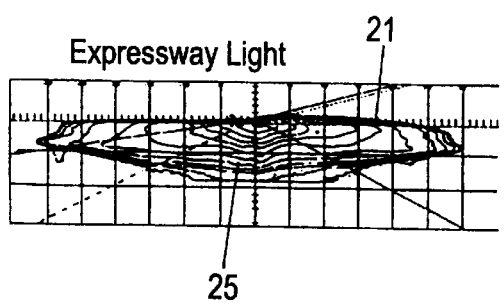
FIGS. 5A and 5B are diagrammatically-depicted light patterns for expressway illumination, respectively on a vertically standing measuring wall and on a driving lane.
Figure 5B:
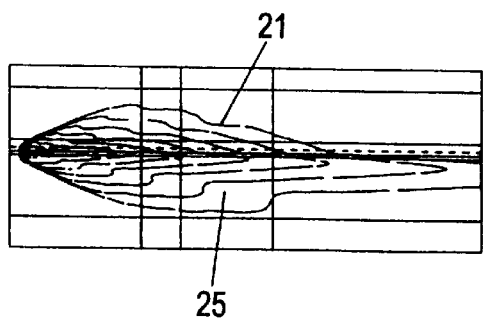
Figure 6A:
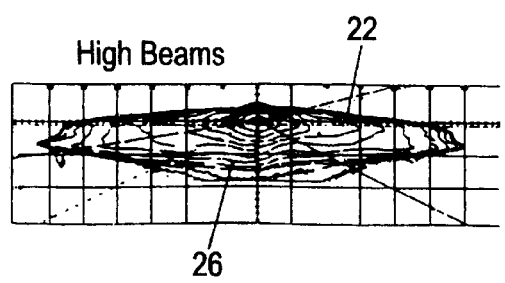
FIGS. 6A and 6B are diagrammatically-depicted light patterns for high beams, respectively on a vertically standing measuring wall and on a driving lane.
Figure 6B:
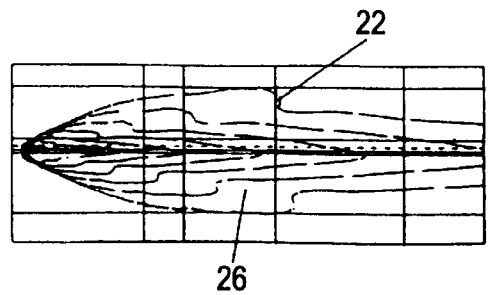
Figure 7:
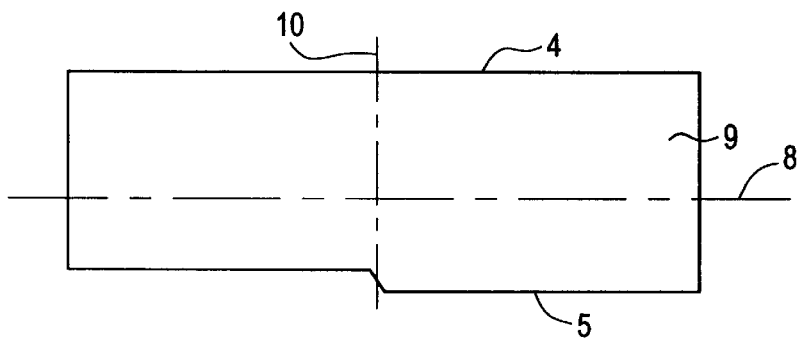
FIGS. 7, and 8 are views of a screen shaft of this invention seen in the direction of an optical axis, respectively with a focal line for symmetric and a focal line for asymmetric light in the optically effective position, FIG. 9 diagrammatically depicts four focal lines of the screen shaft in their optically effective positions.
Figure 8:
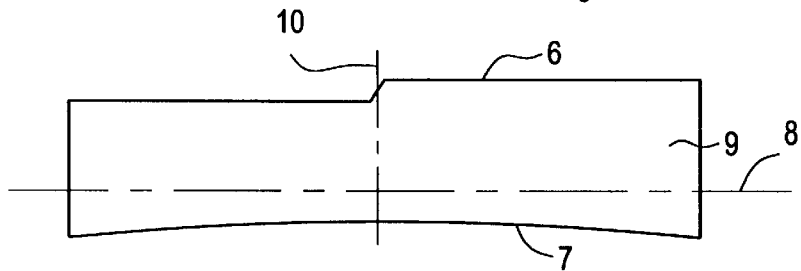
Figure 9:
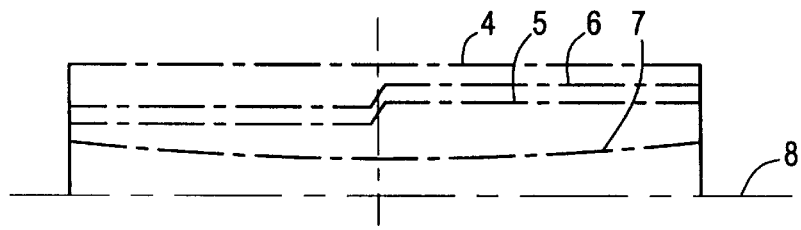

A headlight for vehicles has a light system, which primarily includes an ellipsoidal shaped reflector 1, a light source 14, a lens 2 disposed before the reflector, and a screen shaft 3 coupled to driving mechanisms 16 and 17. The light source 14, which is created by an arc of a gas discharge lamp (not shown), is placed at an interior focal point of the ellipsoidal reflector 1. The screen shaft 3 is adjustable to four rotational positions about an axis of rotation 8 by the first driving mechanism 16 operating through a linkage 27. The screen shaft 3, with laterally positioned bearing elements, which elements are pivot pins (not shown), is set into bearing retainers 15. The second driving mechanism 17 serves for translatory adjustment of the screen shaft 3. The axis of rotation 8 of the screen shaft 3 extends horizontally and at right angles to an optical axis of the reflector 1. The screen shaft 3, which can be brought into four rotational positions, presents, in each rotational position, an optically effective focal line 4, 5, 6 and 7. The first and second focal lines 4 and 5 commonly lie in a plane 11 and the third and fourth focal lines 6 and 7 commonly lie in a plane 12. The planes 11 and 12 are perpendicular to one another, and their line of intersection coincides with the axis of rotation 8. The first focal line 4 produces a light-dark border 19 of a symmetrical low beam which can be designated as basically, city, or bad weather lighting (light pattern 23) and which illuminates exclusively a near area of roadway in front of a vehicle. The third focal line 6 produces a light-dark border 20 for the usual asymmetric low beam light (light pattern 24), with which ones own roadway side is substantially better illuminated than the side of the oncoming traffic. The second focal line 5 produces a light-dark border 21 of an asymmetrical expressway light (light pattern 25). In this case, ones own roadway side, similarly to a customary asymmetrical low beam, is better illuminated far ahead, while an adjacent roadway side receives more illumination in comparison to a conventional low beam. The focal line 7 produces the light-dark border 22 of a symmetrical high beam (light pattern 26).

The focal lines 4, 5, 6, and 7 exhibit varied configurations, that is the first focal line 4 extends in a straight line uniformly spaced from the axis of rotation 8, the second and third focal lines 6 and 5 each have a focal line section inclined to the axis of rotation and another focal line section uniformly spaced from the axis of rotation 8, and the forth focal line 7 forms a concave bow. The focal lines 4, 5, 6 and 7 are interconnected by free-form, mantle surface sections, i.e. irregularly extending surface sections 9 which deviate from the general form of a cylindrical surface. The surface sections 9 are, for the most part, convex and can, at least at one of the focal lines 4, 5,6 and 7 extend at an angle. The driving mechanisms 16, 17 which serve for the adjustment of the screen shaft 3 can, for instance, be made as D. C., or stepping motors.

Figure 10:
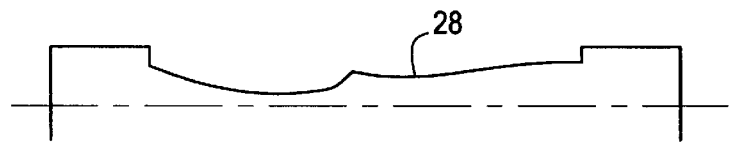
FIGS. 10 and 11 are side views of another screening shaft of this invention showing focal lines.
Figure 11:
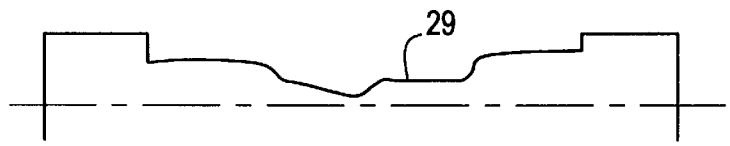

FIGS. 10 and 11 show focal lines 28 and 29 of another screen shaft. The focal line 28 produces a light-dark border of an asymmetrical low beam which reaches a greater extent of illumination on the oncoming traffic side of the road, while the focal line 29 produces a light-dark border of an asymmetrical low beam with limited side illumination of a roadway.

A plate shaped shading means can be installed underneath the stop-shaft 3 on the reflector 1, whose upper edge section is spaced from the screen shaft 3 and, relative to the direction of light emergence, is arranged before or behind the screen shaft 3. In this manner, in each rotational position of the screen shaft 3, emitted light beams passing underneath the respective optically effective focal line 4, 5, 6 and 7, down to the lower rim of the shading means, are blocked. In this mode it is advantageous for a lower edge of the shading means, along its entire length, to extend adjacent to a forward rim of the reflector 1, or lie on the forward rim of the reflector 1.

Figure 12:
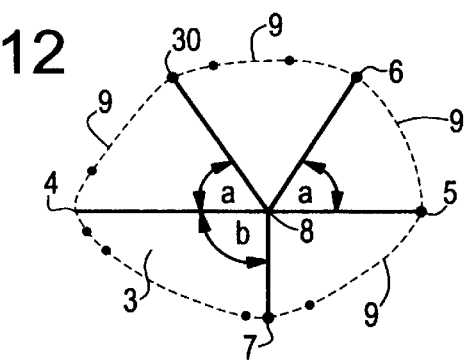
FIG. 12 is a cross-sectional view of a screening shaft of this invention with five focal lines.

The screen shaft 3 in FIG. 12, exhibits, besides the focal lines 4, 5, 6 and 7, a fifth focal line 30 for a symmetric low beam. A rotational positioning of the screen shaft 3 for symmetrical low beam illumination, can be seen as practical, if, for instance, a vehicle for right-hand traffic comes temporarily into a country with left-hand traffic. In the country with left-hand traffic, the asymmetric light patterns given by focal lines 5 and 6 are, forbidden by law since this light blinds oncoming traffic. A switching between the focal line 4 for fog lighting and the focal line 7 for distant lighting is always done over the focal lines 30, 6 and 5. The focal lines 5 and 4 lie in a plane in which the axis of rotation 8, arranged underneath the optical axis, extends. Each of the focal lines 30 and 6 respectively lies in a plane together with the axis of rotation 8, which planes extend at acute angles "a" to the plane, in which the focal lines 4 and 5 lie. The acute angle "a" is about 60°. The plane, in which the focal line 7 for high beams and the axis of rotation 8 are located, stands approximately at a right angle to the plane in which the focal lines 4 and 5 extend. The surface sections 9 between the focal lines 4, 30, 6, 5 and 7 are convex.

The light system with the screen shaft is arranged for symmetric and asymmetric light functions, as well as for curve light, by having the screen shaft coupled with at least the first and a second drive mechanism. A stepping motor can serve as the first drive mechanism, for instance, with which the screen shaft can be brought into a plurality of rotational positions, and a linear motor as the second drive mechanism, with which the screen shaft is adjusted in linear translation. By means of the translatory movement of the screen shaft, it becomes possible to have a light cone follow a course of a curve. The light system with the screen shaft of this invention is suitable for use with both right as well as left-hand traffic, since the screen shaft has bearing elements mountable at both ends, which can be selectively set in, to engage in, two accommodating bearing seats. In this way, the screen shaft can be rotated 180°, and reset in the bearing seats.

A screen shaft, of this invention, provided with focal lines which vary greatly in their shapes, has a mantle surface with many irregularly contoured surface sections. These surface sections can, for example, be convex or even in shape.

In an especially advantageous enhancement of the invention, at least one focal line is symmetrical to, and at least two focal lines are asymmetric to, a vertical plane extending in a light emission direction, with the focal lines, in their optically effective positions, lying in a vertical plane, in which the axis of rotation is found. In this manner each focal line, in its respective optically effective position, borders a focusing area of the lens and thereby produces a sharp light-dark border, which ameliorates as much as possible glare for oncoming traffic.

A screen shaft, which is provided with at least two focal lines for symmetrical and at least two focal lines for asymmetrical light, has a small mass if the symmetric and asymmetric focal lines respectively extend adjacent one another. In this case, it is practical, for the symmetric and asymmetric focal lines to lie in a common plane with the axis of rotation and, where there are four light functions, for two such planes to be perpendicular to one another.

A disturbing reflection of light beams onto the screen shaft is prevented, if the reflectivity of the mantle surface of the screen shaft, in reference to light beams, which are emitted from the light source of the headlight, is less than 40%.

What is claimed is:

1. A headlight for vehicles with a bowl shaped reflector having two focal areas and a lens, said headlight having a screen shaft mounted between the lens and the reflector, which screen shaft rotates about an axis of rotation which extends horizontally and at a right angle to an optical axis of the headlight, the screen shaft being adjustable to a plurality of rotational positions, with a mantle surface thereof having a focal line for each rotational position for producing a light-dark border of a light pattern, wherein at least a half of the mantle surface of the screen shaft which forms a plurality of said focal lines along most of their lengths deviates from a cylindrical surface, in that it deviates from a surface generated by lines parallel to the axis of rotation, and is irregularly shaped; and wherein at least a portion of a first focal line produces an asymmetrical light-dark border and at least a portion of a second focal line produces a symmetrical light-dark border.

2. A headlight in accordance with claim 1, wherein the screen shaft has a plurality of focal lines for low beam light and at least one focal line for high beam, wherein the focal line for high beam light has a smaller spacing from the axis of rotation than do any of the low beam focal lines.

3. A headlight in accordance with claim 1 wherein the screen shaft is coupled to at least a first and a second driving mechanism, the screen shaft being adjustable by the first driving mechanism in its rotational positioning, and adjustable by the second driving mechanism along the axis of rotation.

4. A headlight in accordance with claim 1, wherein the screen shaft has bearing elements mounted on both ends thereof, which engage in two bearing holders and which can be respectively selectively placed in both said bearing holders.

5. A headlight in accordance with claim 1 wherein, at least one irregularly extending surface section in a circumferential direction of the screen shaft is formed to be convex.

6. A headlight in accordance with claim 1, wherein at least one irregular surface section extends inclined to the axis of rotation of the screen shaft.

7. A headlight in accordance with claim 1, wherein at least one focal line is symmetric and at least two focal lines are asymmetric to a vertical plane extending in a direction of emitted light, with the focal lines, when in their optically effective positions, lying in a vertical plane in which the axis of rotation extends.

8. A headlight in accordance with claim 1, wherein at least two focal lines are formed to be symmetric and at least two focal lines are formed to be asymmetric, whereby the symmetric and the asymmetric focal lines are respectively arranged adjacent to one another.

9. A headlight in accordance with claim 7, wherein a symmetric and an asymmetric focal line lie in a common plane, in which the axis of rotation extends.

10. A headlight in accordance with claim 9, wherein two planes in which one symmetric and one asymmetric focal line respectively lie, are perpendicular to each other.

11. A headlight in accordance with claim 1, wherein a shading means is positioned beneath the screen shaft having an upper edge section extending adjacent said screen shaft and, as seen in a beam direction of light, together with the screen shaft forms a continuous shading apparatus for light beams of a light source of the headlight.

12. A headlight as in claim 1 wherein the axis of rotation is approximately at a center of gravity of the screen shaft.

13. A headlight for vehicles with a bowl shaped reflector having two focal areas and a lens, said headlight having a screen shaft mounted between the lens and the reflector, which screen shaft rotates about an axis of rotation which extends horizontally and at a right angle to an optical axis of the headlight, the screen shaft being adjustable to a plurality of rotational positions, with a mantle surface thereof having a focal line for each rotational position for producing a light-dark border of a light pattern, wherein a portion of the mantle surface of the screen shaft which forms a plurality of said focal lines along most of their lengths deviates from a cylindrical surface and is irregularly shaped; and wherein at least one focal line is symmetric and at least two focal lines are asymmetric to a vertical plane extending in a direction of emitted light, with the focal lines, when in their optically effective positions, lying in a vertical plane in which the axis of rotation extends.

14. A headlight for vehicles with a bowl shaped reflector having two focal areas and a lens, said headlight having a screen shaft mounted between the lens and the reflector, which screen shaft rotates about an axis of rotation which extends horizontally and at a right angle to an optical axis of the headlight, the screen shaft being adjustable to a plurality of rotational positions, with a mantle surface thereof having a focal line for each rotational position for producing a light-dark border of a light pattern, wherein a portion of the mantle surface of the screen shaft which forms a plurality of said focal lines along most of their lengths deviates from a cylindrical surface and wherein at least two focal lines are formed to be symmetric and at least two focal lines are formed to be asymmetric, whereby the symmetric and the asymmetric focal lines are respectively arranged adjacent to one another.

15. A headlight in accordance with claim 13, wherein a symmetric and an asymmetric focal line lie in a common plane, in which the axis of rotation extends.

16. A headlight in accordance with claim 15, wherein two planes in which one symmetric and one asymmetric focal line respectively lie, are perpendicular to each other.

* * * * *